(12) United States Patent
Eizips et al.

(10) Patent No.: US 11,973,350 B2
(45) Date of Patent: Apr. 30, 2024

(54) SYNCHRONIZATION OF SIGNALS TRANSMITTED OVER POWER LINES

(71) Applicant: Tigo Energy, Inc., Campbell, CA (US)

(72) Inventors: Daniel Eizips, Sunnyvale, CA (US); Sergey Kondrashov, Los Gatos, CA (US); Jeffrey Dwain Sanders, San Jose, CA (US); Benjamin Victor Duane Henry, San Jose, CA (US)

(73) Assignee: Tigo Energy, Inc., Campbell, CA (US)

( * ) Notice: Subject to any disclaimer, the term of this patent is extended or adjusted under 35 U.S.C. 154(b) by 470 days.

(21) Appl. No.: 17/225,885

(22) Filed: Apr. 8, 2021

(65) Prior Publication Data

US 2021/0320500 A1 Oct. 14, 2021

Related U.S. Application Data

(60) Provisional application No. 63/008,438, filed on Apr. 10, 2020.

(51) Int. Cl.
| | |
|---|---|
| *H02J 3/38* | (2006.01) |
| *H04B 1/04* | (2006.01) |
| *H04B 3/32* | (2006.01) |
| *H04B 3/54* | (2006.01) |

(52) U.S. Cl.
CPC ............... *H02J 3/381* (2013.01); *H04B 1/04* (2013.01); *H04B 3/32* (2013.01); *H04B 3/54* (2013.01); *H02J 2300/24* (2020.01); *H04B 2001/0491* (2013.01)

(58) Field of Classification Search
CPC .. H02J 3/381; H02J 2300/24; H02J 13/00009; H04B 1/04; H04B 3/32; H04B 3/54; H04B 2001/0491; Y02E 10/56; Y02E 60/00; Y04S 40/121
See application file for complete search history.

(56) References Cited

U.S. PATENT DOCUMENTS

| | | | | |
|---|---|---|---|---|
| 7,142,501 | B1 * | 11/2006 | Barrass | H04L 5/1461 |
| | | | | 386/274 |
| 2007/0171820 | A1 * | 7/2007 | Matsunaga | H04L 47/564 |
| | | | | 370/229 |
| 2015/0215059 | A1 * | 7/2015 | Kerpez | H04M 11/062 |
| | | | | 379/406.01 |
| 2019/0080346 | A1 * | 3/2019 | Sella | H02S 50/00 |

* cited by examiner

*Primary Examiner* — Charles Cai

(74) *Attorney, Agent, or Firm* — Greenberg Traurig

(57) ABSTRACT

A transmitter having: an oscillator to generate a clock signal and synthesize frequencies for modulating a message to generate first signals to a first direct current power line, and a control circuit to adjust timing of the first signals in synchronization with second signals transmitted in a second direct current power line disposed in a vicinity of the first direct current power line, by synchronizing phase of the first and second signals or by transmitting the first and the second signals in separate time windows.

14 Claims, 4 Drawing Sheets

SYNCHRONIZATION OF SIGNALS TRANSMITTED OVER POWER LINES

CROSS-REFERENCE TO RELATED APPLICATIONS

This application claims priority to U.S. Provisional Application No. 63/008,438 filed on Apr. 10, 2020 and entitled "Synchronization of Signals Transmitted over Power Lines," which is hereby incorporated herein by reference in its entirety.

FIELD OF THE TECHNOLOGY

The present disclosure generally relates to power line communications, and, more particularly, to synchronization of signals transmitted over closely disposed power lines to multiple groups of photovoltaic panels.

BACKGROUND

Rapid Shutdown Systems (RSS) have been used in power generation systems involving photovoltaic panels (e.g., solar panels).

Rapid Shutdown System (RSS) can be implemented by configuring a transmitter at a location away from the photovoltaic panels to control the photovoltaic panels. Each photovoltaic panel can have a Local Management Unit (LMU) that controls the operation of the photovoltaic panel. Based on the signals from the transmitter, or the lack of signals from the transmitter, a watchdog of the local management unit can selectively turn on or off the photovoltaic panel.

For example, a string or array of the photovoltaic panels can be connected to power a direct current (DC) power line to provide the electric power generated by the string or array to an inverter that is configured at a convenient location away from the installation site of the photovoltaic panels (e.g., a rooftop). A power line communication (PLC) transmitter can transmit signals onto the power line for transmission to local management units configured on the photovoltaic panels. Each local management unit can decode the signals from the power line to perform requested actions, such as turning off the photovoltaic panel, continuing power generation, etc.

For example, the PLC transmitter can transmit a keep-alive message to a Local Management Unit (LMU) to instruct the Local Management Unit (LMU) to continue the normal operation of its photovoltaic panel in generating and/or outputting electric power for a predetermined period of time. After the predetermined amount of time, a watchdog of the Local Management Unit (LMU) is configured to automatically turn off its photovoltaic panel if another keep-alive message is not received to continue the normal operation of its photovoltaic panel.

Alternatively, the transmitter can transmit an accelerated shutdown message to a Local Management Unit (LMU) to instruct the Local Management Unit (LMU) to immediately turn off its photovoltaic panel upon receiving the accelerated shutdown message.

Thus, when the communication path between the transmitter and the Local Management Unit (LMU) can be used to transmit the accelerated shutdown message, the photovoltaic panel(s) can be turned off rapidly via the transmission of the accelerated shutdown message. However, when the communication path between the transmitter and the Local Management Unit (LMU) is damaged, the photovoltaic panel can be turned off automatically for the lack of the keep-alive message by the watchdog of the Local Management Unit (LMU) within the predetermined period of time.

For example, remote shutdown can be implemented using watchdog techniques disclosed in U.S. Pat. Nos. 7,884,278, 7,807,919, 8,271,599, 9,124,139, 8,854,193, 9,377,765, 10,063,056, 8,933,321, 8,823,218, 9,397,612, 9,813,021, 10,256,770, and 10,312,857, the entire disclosures of which are incorporated herein by reference.

A large installation of photovoltaic panels can involve multiple sets of power lines connected to multiple strings or groups of photovoltaic panels respectively. The power lines of the different strings or groups may be disposed in a vicinity of each other, such as sharing the same conduit or run next to each other in parallel over a distance. Such an arrangement can result in crosstalk, where changes in the magnetic field caused by a signal transmitted on one power line induces a corresponding signal on another closely disposed power line. The induced signal may cancel, weaken, or disrupt the signal transmitted in the parallel power line. The interference from the induced signal can result in errors in decoding signals and/or unintended behaviors.

As such, what is desired is an improved power line communication system with reduced interference between signals conducted in adjacent power lines.

SUMMARY OF DESCRIBED SUBJECT MATTER

In some embodiments, the present disclosure provides an exemplary technically improved power system which includes a transmitter having: an oscillator to generate a clock signal and synthesize frequencies used to modulate a message and to generate first signals to a first direct current power line; and a control circuit to adjust timing of the first signals in synchronization with second signals transmitted in a second direct current power line disposed in a vicinity of the first direct current power line, by synchronizing phase of the first and second signals or by transmitting the first and the second signals in separate time windows.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

The present disclosure relates to a power line communication. Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Figure 1:
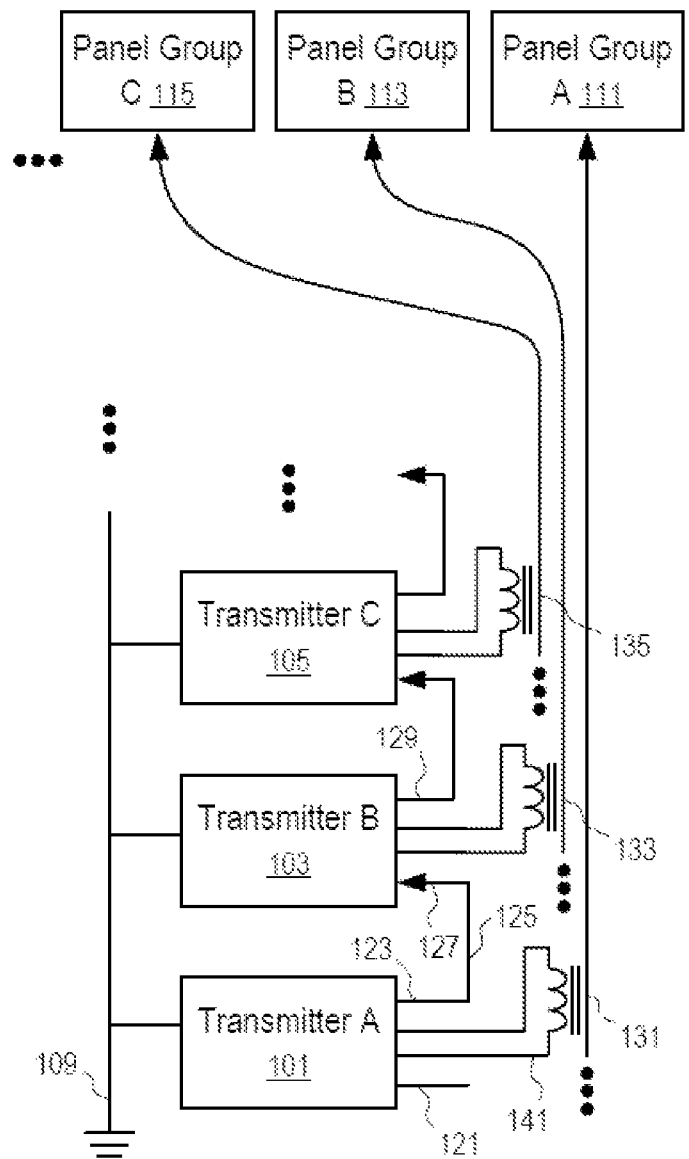
FIG. 1 shows a system configured to synchronize transmission of signals over power lines connected to photovoltaic panels according to one embodiment of the present disclosure.

FIG. 1 shows a system configured to synchronize transmission of signals over power lines connected to photovoltaic panels according to one embodiment. In general, there are different synchronization approaches to avoid interferences due to crosstalk. One approach is to transmit same signal, in phase, at the same time. Another approach is to transmit signals according to a synchronized time schedule at different time instances such that crosstalk does not interfere with each other. For example, the transmission of signals by different transmitters can be synchronized for simultaneous actions, like synchronized swimmers performing a same action simultaneously. Alternatively, the transmission of signals by different transmitters can be synchronized for sequential actions according to coordinated timing, like synchronized swimmers jumping to the water in sequence according to a time schedule. These approaches can be implemented in the system of FIG. 1, as further discussed below.

The system of FIG. 1 has multiple groups (111, 113, 115, . . . ) of photovoltaic panels. Each of the panel groups (111, 113, 115, . . . ) can have one or more photovoltaic panels. The outputs of the photovoltaic panels in each group can be connected in parallel and/or in series to power a direct current (DC) power line. The DC powerlines (131, 133, 135, . . . ) of the panel groups (111, 113, 115, . . . ) run from the installation sites of the panel groups (111, 113, 115, . . . ) through a centralized location where transmitters (101, 103, 105, . . . ) are configured. The DC powerlines (131, 133, 135, . . . ) run through the centralized location to their respective loads, such as inverters, battery chargers, and/or a combiner that combines the powers from the different power lines as one output.

Each of the photovoltaic panels in the panel groups (111, 113, 115, . . . ) can have a Local Management Unit (LMU). In response to an accelerated shutdown message received via a power line, the Local Management Unit (LMU) can turn off the respective photovoltaic panel by reducing the voltage in the photovoltaic panel and/or its output to below a threshold, and/or de-energizing the photovoltaic panel. In response to a keep-alive message, a watchdog circuit of the Local Management Unit (LMU) can avoid turning off the respective photovoltaic panel for a predetermined period of time in absence of the shutdown message.

Each of the transmitters (101, 103, 105, . . . ) is exemplarily coupled to a common ground (109) and configured to generate and transmit a keep-alive message for the watchdog circuits of the Local Management Units (LMUs). The keep-alive message is transmitted onto a power line (e.g., 131, 133, or 135). For example, an inductive coupling between the transmitter (e.g., 101, 103, or 105) and a power line (e.g., 131, 133, or 135) can be used to induce signals on the power line (e.g., 131, 133, or 135) to transmit the keep-alive message. Alternatively, the transmitters can be configured to transmit the keep-alive message into the power line (e.g., 131, 133, or 135) via direct connections.

The signals of a message transmitted by a transmitter (e.g., 131, 133, or 135) can be generated via spread frequency shift keying (S-FSK). For example, a continuous wave signal of an intermediate frequency (IF) can synthesize a first frequency (Mark Frequency) and a second frequency (Space Frequency), which are modulated by a state machine through a multiplexer to implement S-FSK and form a message (e.g., containing 33-bit data in the form of three, eleven-bit words) that is transmitted over a first time period (e.g., 168 ms) (transmission period) followed by a second time period of transmission silence (e.g., 901 ms) (silence period).

The transmitters (101, 103, 105, . . . ) can be configured to transmit different messages having different data encoded using S-FSK. The messages can include keep-alive, accelerated shutdown, permission to operate, having permission to operate, and/or having no permission to operate, and/or proprietary messages in proprietary formats and/or proprietary modulation methods, etc. In some implementations, the lack of a keep-alive message for a period of a predetermined length (e.g., 13 seconds) can be considered a shutdown message.

In FIG. 1, each of the transmitters (101, 103, 105, . . . ) has an input line for synchronization (e.g., sync-in) and an output line for synchronization (e.g., sync-out). The sync-out (e.g., 123) of a transmitter (e.g., 101) can be connected (125) to the sync-in (e.g., 127) of another transmitter (e.g., 103) so that the transmission periods of the transmitters (101, 103, 105, . . . ) are coordinated to avoid interference that may occur due to potential crosstalk among the DC power lines (131, 133, 135, . . . ). For the example, the transmitters (101, 103, 105, . . . ) can be coordinated in phase if they transmit at the same time, or coordinated by taking turns in transmitting.

One of the transmitters (e.g., 101) can function as a master transmitter that does not receive an input in its sync-in terminal (121). Its sync-out terminal (123) is connected (125) to the sync-in terminal (127) of the next transmitter (e.g., 103); the sync-out terminal (129) of the next transmitter (e.g., 103) can be connected to the sync-in terminal of a further transmitter. For example, slave transmitters can be daisy chained and/or connected in parallel.

Figure 2:
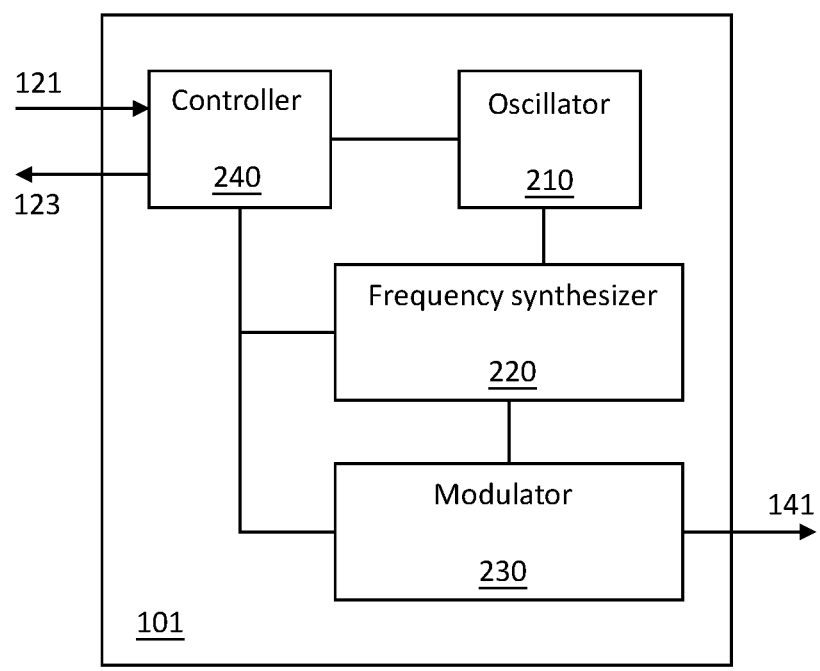
FIG. 2 is a block diagram of a transmitter according to an embodiment of the present disclosure.

FIG. 2 is a block diagram of an exemplary transmitter (101) according to an embodiment of the present disclosure. For example, the transmitter (101) of FIG. 2 can be used to implement each of the transmitters (101, 103, 105) in the system of FIG. 2. The transmitter (101) of FIG. 2 includes an oscillator (210) for generating a clock signal which is supplied to a frequency synthesizer (220). The clock signal is then modulated to generate a first signal (141) to be induced to the first DC power line (131). The transmitter (101) also includes a controller (240) controls timing of the first signal (141). The controller (101) has an input terminal (121) and an output terminal (123). The input terminal (121) receives a timing signal for controlling the first signal (141). The output terminal (123) exemplarily passes through the timing signal to the next transmitter (103) as shown in FIG. 1.

Figure 3A:
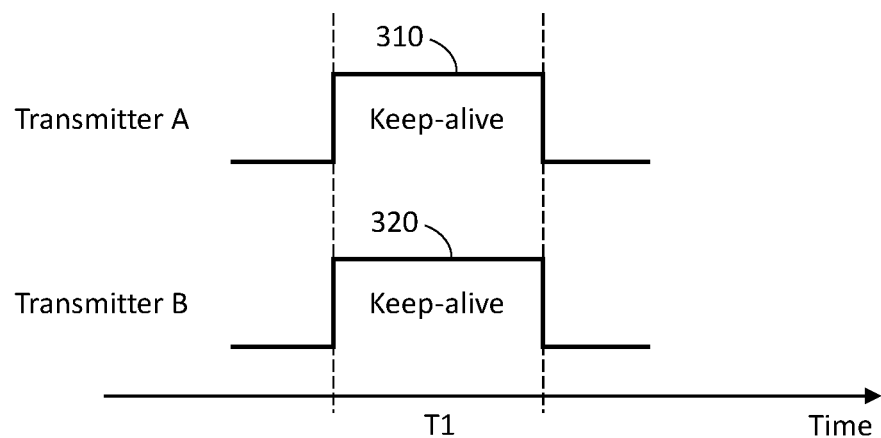
FIGS. 3A and 3B show timing diagrams of two of the transmitters according to embodiments of the present disclosure.
Figure 3B:
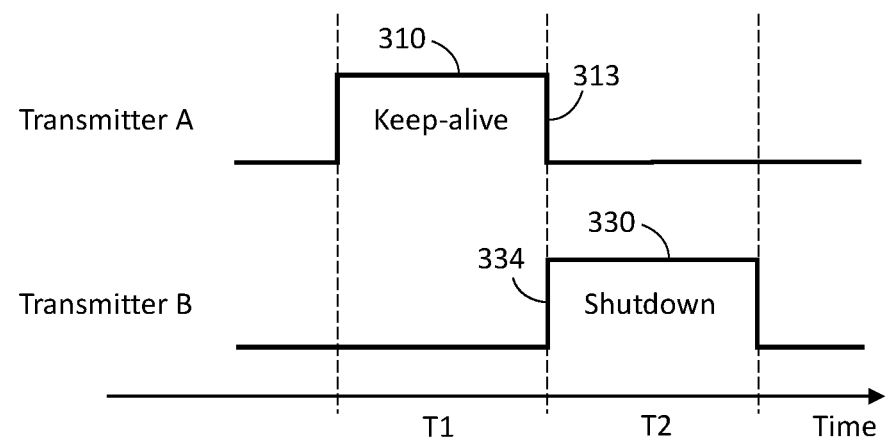

FIGS. 3A and 3B show timing diagrams of two of the transmitters (101 and 103) according to an embodiment of the present disclosure. Referring to FIG. 3A, when transmitter A (101) and transmitter B (103) are to transmit the same message (e.g., Keep-alive), the sync-out and sync-in signals passed from transmitter A (101) to the transmitter B (103) over the connection 125 can cause their transmission of the message in substantially overlapped time windows (310 and 320) for a duration of T1. After a predetermined period of time, the Keep-alive message can be repeated in substantially overlapped time windows to prevent the Local Management Units in the panel groups (111 and 113), connected to the respective power lines (131 and 133) from shutting the panel groups (111 and 113).

For example, when the master transmitter (101) starts a transmission period (310) containing signals (141) for its keep-alive message on the DC power line (131), it also provides a timing signal from its sync-out terminal (123) to the sync-in terminal (127) of the next transmitter (103), causing the next transmitter (103) to start its transmission period (320) containing signals for its keep-alive message on the DC power line (133) such that the timing and phase of the keep-alive messages are substantially in synchronization with each other. Therefore, potential crosstalk among the DC power lines (131 and 133) does not degrade the signals and/or interfere with each other.

Similarly, the next transmitter (103) can provide sync-out signal to control the timing or phase of a further transmitter (105) for synchronization. Although cascading signals inevitably causes delay, the aforementioned transmissions are substantially or sufficiently coordinated, e.g., in substantially the same time, so that the messages are not corrupted even when there is crosstalk between the power lines (131, 133, 135) and thus the transmitted signals/message can be correctly received by the Local Management Units in the photovoltaic panel groups (111, 113 and 115).

Referring to FIG. 3B, when the transmitters (101, 103, 105, . . . ) are used to transmit different messages, the timing signals provided through the sync-out to sync-in connection (e.g., 125) can be used to schedule different messages in different time windows relative to the timing signals. For example, the synchronization signal transmitted from the connection (e.g., 125) can have a rising edge representing the start of the time window (310) of its Keep-alive message (or another message) and a falling edge (313) representing the end of the time window (310); and a slave transmitter (103) can be configured to start the time window (330) of transmission a different message (e.g., Shutdown message) in response to the falling edge (313) of the synchronization signal it receives at its sync-in terminal (127) from its master transmitter (101) that provides the synchronization signal on its sync-out terminal (123) over the connection (125). Based on its transmission time window (330), the transmitter (103) generates its synchronization signal on its sync-out terminal (129), with a rising edge (334) to indicate the start of its transmission time window (330) and a falling edge to indicate the end of the time window (330).

As shown in FIG. 3B, a transmission time duration T2 for transmitter B (103) has no overlap with the transmission time duration T1 for transmitter A (101). Thus, transmission by transmitter B (103) a message different from the message of transmitter A (101) does not corrupt the message of transmitter A (101), even when there is crosstalk between the power lines 131 and 133. In one implementation, the falling edge (313) of the sync-in signal of the time window (310) of transmitter A (101) triggers a rising edge (334) of the sync-in signal (330) of transmitter B (103). This arrangement causes the transmitters to automatically cascade their transmissions like dominos or synchronized swimmers jumping into a pool.

For example, the timing signals in the sync-out to sync-in connections (e.g., 125) can be used to indicate the timing for the transmission of keep-alive message. When a transmitter (e.g., 103) is about to transmit its message, the transmission period can start with a predetermined offset from the transmission period of the keep-alive message to avoid potential interference due to crosstalk.

The sync-out to sync-in connections of the transmitters (101, 103, 105, . . . ) can be configured in a daisy chain configuration or a star configuration.

The timing signal in a connection (e.g., 125) from a sync-out terminal (123) of a master transmitter (e.g., 101) to a sync-in terminal (127) of a slave transmitter (e.g., 103) can be the envelope profile signal of transmissions generated by the master transmitter (e.g., 101), or a signal with a predetermined time relation to the envelope profile signal (e.g., rising edge, falling edge, levels, etc.) of transmissions generated by the master transmitter (e.g., 101), or a synchronization signal with a dynamically or predetermined time relation with a rising or falling edge of the synchronization signal.

Optionally, for more precise synchronization, an additional reference frequency can be included for phase locking oscillators between transmitters; and the slave transmitter is configured to phase lock with the reference frequency.

Optionally, the timing signal includes a copy of the signals transmitted by the master transmitter (e.g., 101) over its power line (e.g., 131); and the slave transmitter (e.g., 103) can re-transmit the signals on its power line (e.g., 133) to provide the same message. The slave can also simply re-transmit the master's signal without any timing adjustment (e.g., the slave functions as an analog amplifier for the master's transmission to Local management Units (LUMs) and/or relaying any synchronization signals to other slaves).

Optionally, the timing signal includes a copy of the transmitter's unmodulated message (e.g., 101); and the slave transmitter (e.g., 103) can optionally delay or replace the unmodulated message for modulation and transmission at a predetermined time window by providing its own different modulated message, or the master's modulated message.

Optionally, the slave transmitter (e.g., 103) can generate separate sync-out signals in response to its received sync-in signals. Alternatively, the slave transmitter (e.g., 103) amplifies its received sync-in signals and provides the amplified sync-in signals at its sync-out terminal. Re-transmission of the received sync-in signals can be performed to reduce propagation delay of generating a separate sync signal. Alternatively, digital signals can be used for synchronization, which can be regenerated, then transmitted without amplification.

The slave transmitter (e.g., 103) can be configured to adjust its timing for every transmission period, or a predetermined number of transmission periods, after it senses a periodic sync signal and dynamically determines that it is a slave transmitter. Alternatively, a slave transmitter can be hard configured to be a slave transmitter.

FIG. 1 illustrates the synchronization/coordination of transmission time periods using sync-out to sync-in connections (e.g., 125). Alternatively, synchronization/coordination can be implemented without any timing signals being transmitted via sync-out and sync-in terminals.

For example, a transmitter (e.g., 101) can dynamically detect a modulated PLC message transmitted on the power line (131). During a silence period of the transmitter (e.g., 101), the transmitter (e.g., 101) can listen to the power line for signals that are not transmitted by the transmitter (e.g., 101). If a signal is detected, the transmitter (e.g., 101) can use the detected signal as a timing signal to re-calibrate its timing schedule for transmitting message. If no signal is detected, the transmitter (e.g., 101) sends its message without adjusting its transmission timing.

For example, during an initial period, the transmitters (101, 103, 105, . . . ) can listen to their respective power lines (131, 133, 135, . . . ) for silence and randomly decide to start transmission of their messages. During their respective silence periods, the transmitters (101, 103, 105, . . . ) further listen to their respective power lines (131, 133, 135, . . . ) for crosstalk from out of sync transmissions of other messages. If messages from other transmitters are detected, the transmitters (101, 103, 105, . . . ) adjust their respective transmission timing for synchronization with other transmitters. Thus, synchronization can be achieved after a number of iterations; and the transmission of other messages can be scheduled relative to the timing of other messages. When such a synchronization technique is used, the sync-in and sync-out terminals can be eliminated. Transmission collision can occasionally happen when two or more transmitters detect silence and decide to transmit at the same time. This is tolerable provided that collisions don't happen frequent enough to trigger the watchdog in a Local Management Unit (LMU) from shutting down a photovoltaic panel.

The transmission timing of a transmitter can be adjusted via resetting the frequency synthesizer of the transmitter. For example, the frequency of the oscillator or phase locked intermediate frequency in a transmitter for synthesis of the frequencies for S-FSK modulation of message data should be at least two orders of magnitude higher or be phase locked to each other for the S-FSK frequencies to achieve acceptable phase differences for simultaneous transmissions. A timing signal received in the sync-in terminal (or determined in response to detecting a message) can be used to reset the frequency synthesizer and the modulator that controls the transmission state at a predetermined time of the transmission cycle. Such a reset operation can be adequate to synchronize the transmitters within a few degrees of phase.

Optionally, a slave transmitter can be configured to indicate that it is in a slave mode via LED or another user interface element.

Optionally, a slave transmitter can be configured to count the timing signal received in its sync-in terminal. If a slave ceases to count the arrival of the timing signal at its sync-in terminal at a predetermined and proper frequency, either by design or through failure, the slave can assume the role of a master transmitter to generate its sync-out signals to control other slave transmitters.

Optionally, a master transmitter can be configured to indicate that it is in a master mode via LED or some other means.

Figure 4:
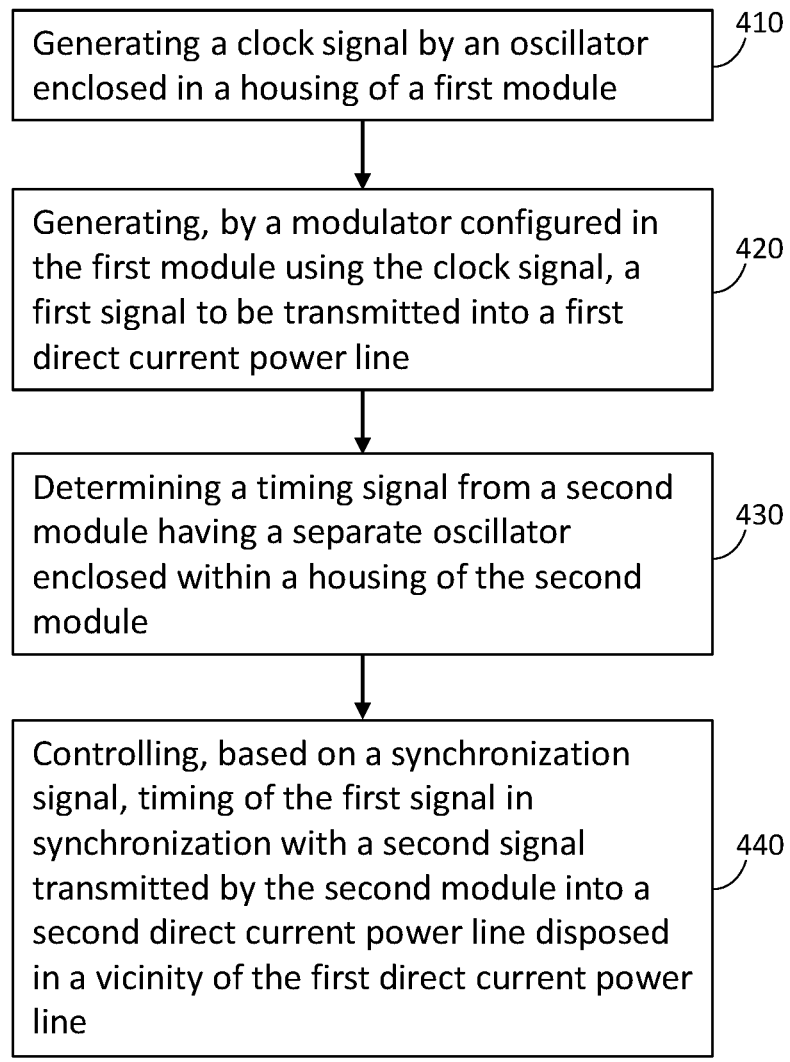
FIG. 4 is a flowchart illustrating a system operation according to embodiment of the present disclosure.

FIG. 4 is a flowchart illustrating a system operation according to embodiment of the present disclosure. For example, the method illustrated in FIG. 4 can be implemented in the system of FIG. 1, with each transmitter implemented in a way as illustrated in FIG. 2 to synchronize time windows of their message transmissions in timing illustrated in FIGS. 3A and 3B. Each transmitter (e.g., 101) can be configured as a module usable to remote control the operations of a solar panel group (e.g., 111) by generating and sending messages (e.g., Keep-alive, Shutdown). To coordinate the timing of their transmissions, the sync-in and sync-out terminals of the modules/transmitters can be connected (e.g., as illustrated in FIG. 1, in a chain configuration, or a star configuration)

In block 410, a first module (e.g., transmitter 103) generates a clock signal by an oscillator enclosed in a housing of the first module. In block 420, a first signal is generated, by a modulator (230) using the clock signal, to be transmitted into a first DC power line (e.g., 133). In block 430, the first module (e.g., transmitter 103) determines a timing signal (e.g., an envelope signal of a second signal for sending a message in a time window (310)) from a second module (e.g., transmitter 101) having a separate oscillator (210) enclosed within a housing of the second module. In block 440, the first module (e.g., transmitter 103) controls, based on the timing signal, timing of the first signal (e.g., transmitted in a timing window (320 or 330)) in synchronization with a second signal transmitted by the second module (e.g., in the timing window (310)) into a second DC power line (e.g., 131). Thus, even when the second DC power line (e.g., 131) is disposed in a vicinity of the first DC power line (e.g., 133), crosstalk between the lines (131 and 133) do not corrupt the first and second signals.

In one example, each slave transmitter can be given a time slot to transmit a message, either repeated or unique. The timeslots are relatively based on the transmission a timing signal or beacon of the master transmitter. The time slots can be assigned by the master, or they can be self-assigned by switches on the slaves or "initial" timing of falling edges of slaves.

The techniques discussed above can provide scalability and increase the reliability of signals transmitted via power lines by a Rapid Shutdown System (RSS) for an array of photovoltaic panels.

What is claimed is:

1. A transmitter, comprising:
    an oscillator configured to generate a clock signal;
    a modulator configured to generate, based on the clock signal, first signals to be transmitted on a first direct current power line;
    a control circuit configured to adjust timing of the first signals, transmitted on the first direct current power line, in synchronization with second signals transmitted on a second direct current power line disposed in a vicinity of the first direct current power line, by synchronizing phase of the first and second signals or by transmitting the first and the second signals in separate time windows;
    a first terminal configured to receive a first timing signal, wherein the control circuit, or a controller executing instructions, is configured to adjust the timing of the first signals in accordance with the first timing signal; and
    a frequency synthesizer,
    wherein the control circuit is configured to adjust the timing of the first signals by resetting the frequency synthesizer and the modulator in response to the first timing signal;
    wherein the first terminal is configured to receive a reference frequency as the first timing signal for phase locking and a profile envelope signal of transmissions of the second signals in the second direct current power line.

2. The transmitter of claim 1, wherein the control circuit is configured to adjust the timing of the first signals by phase locking the first signals to the first timing signal.

3. The transmitter of claim 1, further comprising a second terminal configured to provide a second timing signal or pass through the first timing signal.

4. The transmitter of claim 1, wherein the control circuit is configured to detect crosstalk and adjust the timing of the first signals based on timing of the crosstalk.

5. The transmitter of claim 1, wherein the first and the second direct current power lines are coupled to different photovoltaic panels.

6. A transmitter, comprising:

an oscillator;

a frequency synthesizer coupled to the oscillator;

a modulator coupled to the frequency synthesizer to generate first signals representative of a message to a first local management unit of a first photovoltaic panel;

a control circuit coupled to the frequency synthesizer to adjust timing of the first signals, induced into a first direct current power line connected to first photovoltaic panel having the first local management unit, in synchronization with second signals transmitted in a second direct current power line connected to a second local management unit of a second photovoltaic panel; and a first terminal configured to receive a first timing signal from a module configured to transmit the second signals, wherein the control circuit is configured to adjust the timing of the first signals in accordance with the first timing signal;

wherein the first terminal is configured to receive a reference frequency as the first timing signal for phase locking and a profile envelope signal of transmissions of the second signals in the second direct current power line.

7. The transmitter of claim 6, wherein the control circuit is configured to adjust the timing of the first signals by resetting the frequency synthesizer and the modulator in response to the first timing signal.

8. The transmitter of claim 6, wherein the control circuit is configured to adjust the timing of the first signals by phase locking the first signals to the first timing signal.

9. The transmitter of claim 6, further comprising a second terminal configured to provide a second timing signal or pass through the first timing signal.

10. The transmitter of claim 6, wherein the control circuit is configured to detect crosstalk and adjust the timing of the first signals based on timing of the crosstalk.

11. The transmitter of claim 6, wherein the first and the second direct current power line are coupled to different photovoltaic panels.

12. A method, comprising:

generating a clock signal by an oscillator enclosed in a housing of a first module;

generating, by a modulator configured in the first module using the clock signal, a first signal to be transmitted into a first direct current power line;

determining a timing signal from a second module having a separate oscillator enclosed within a housing of the second module;

controlling, based on the timing signal, timing of the first signal in synchronization with a second signal transmitted by the second module into a second direct current power line;

generating, by the first module, a second timing signal according to a time window of transmission of the first signal; and providing, by the first module, the second timing signal on a terminal of the first module.

13. The method of claim 12, further comprising:

phase locking the first signal to the timing signal from the second module.

14. The method of claim 12, further comprising:

generating an envelope signal of the first signal transmitted into the first direct current power line, wherein the second timing signal is based on the envelope signal.

* * * * *